(12) United States Patent
Cheung et al.

(10) Patent No.: US 6,870,696 B2
(45) Date of Patent: Mar. 22, 2005

(54) CMOS LOW-NOISE MR READ HEAD PRE-AMPLIFIER CIRCUIT

(75) Inventors: Wayne L. Cheung, San Jose, CA (US); Stephen A. Jove, Watsonville, CA (US)

(73) Assignee: International Business Machines Corporation, Armonk, NY (US)

( * ) Notice: Subject to any disclaimer, the term of this patent is extended or adjusted under 35 U.S.C. 154(b) by 378 days.

(21) Appl. No.: 10/041,796

(22) Filed: Jan. 7, 2002

(65) Prior Publication Data

US 2003/0128450 A1 Jul. 10, 2003

(51) Int. Cl.$^7$ .................................................. G11B 5/09
(52) U.S. Cl. ............................. 360/46; 360/65; 360/68; 330/250; 330/253; 330/254; 330/260
(58) Field of Search ............................... 360/55, 65–68, 360/39, 46, 61, 113; 330/250, 260, 253–254, 293, 307, 252, 259, 258, 110, 302–306; 327/524, 541, 543

(56) References Cited

U.S. PATENT DOCUMENTS

| | | | | |
|---|---|---|---|---|
| 4,635,142 A | | 1/1987 | Haugland ..................... 360/46 |
| 5,122,915 A | * | 6/1992 | Klein et al. ................... 360/67 |
| 5,270,882 A | | 12/1993 | Jove et al. ..................... 360/67 |
| 5,323,278 A | | 6/1994 | Contreras et al. ............. 360/67 |
| 5,831,784 A | * | 11/1998 | Barnett et al. ................ 360/67 |
| 5,841,318 A | * | 11/1998 | Cram ............................. 330/9 |
| 6,054,901 A | * | 4/2000 | Nainar et al. ................ 330/292 |
| 6,057,972 A | | 5/2000 | Castellucci .................. 360/66 |
| 6,066,987 A | * | 5/2000 | Lorenz ........................ 330/311 |
| 6,084,469 A | * | 7/2000 | Lorenz ........................ 330/252 |
| 6,134,060 A | | 10/2000 | Ryat ............................ 360/46 |
| 6,219,195 B1 | * | 4/2001 | Jusuf et al. ................... 360/67 |
| 6,396,346 B1 | * | 5/2002 | Ranmuthu et al. .......... 330/252 |

OTHER PUBLICATIONS

"Low–Noise High–Bandwidth Voltage–Biasing MR–Element Preamplifier with Short Circuit Protection", Nov. 1, 1993, IBM Technical Disclosure Bulletin, vol. No. 36, Issue No. 11, pp. 113–114.*
"Low Voltage Preamp Front End Stage for Magneto–Resistive Heads", Mar. 1, 1993, IBM Technical Disclosure Bulletin, vol. No. 36, Issue No. 3, pp. 393–396.*
"DC MR Preamplifier with Short Circuit Protection", Nov. 1, 1993, IBM Technical Disclosure Bulletin, vol. No. 36, Issue No. 11, pp. 585–586.*
Klein et al, "A 0.8nV/√Hz CMOS Preamplifier for IC–Magneto–Resistive Read Elements", Dec. 1994, IEEE Journal of Solid–State Circuits, vol. 29, No. 12, pp. 1589–1595.*
Säckinger, Eduard et al.; A High–Swing, High–Impedance MOS Cascode Circuit; IEEE Journal of Solid–State Circuits, vol. 25, No. 1, Feb. 1990.
Lam, Steve et al; A 55 Mb/s GMR Read/Write Amplifier using 0.5μm 5V CMOS Process, 2000 IEEE International, Feb. 7–9, 2000.
Gray, Paul R. et al; Analysis and Design of Analog Integrated Circuits third Edition, John Wiley & Sons, Inc.

\* cited by examiner

*Primary Examiner*—Andrew L. Sniezek
*Assistant Examiner*—Natalia Figueroa
(74) *Attorney, Agent, or Firm*—Zilka-Kotab, PC (57) ABSTRACT

A preamplifier system is provided for use with a magneto-resistive (MR) sensor. Included is an alternating current (AC) coupling module connected to the MR sensor for blocking a direct current (DC) voltage associated with an input signal, and filtering low frequency noise associated with the input signal. Also provided is a gain stage module coupled to the AC coupling module. The gain stage module includes a plurality of cascode field effect transistors (FETs) configured for amplifying the input signal, while reducing intrinsic noise and increasing operational bandwidth. Coupled to the gain stage module is a control circuit for feeding back an output of the gain stage module for bias regulation and disturbance rejection.

21 Claims, 5 Drawing Sheets

CMOS LOW-NOISE MR READ HEAD PRE-AMPLIFIER CIRCUIT

FIELD OF THE INVENTION

The present invention relates to pre-amplifiers, and more particularly, this invention relates to improving pre-amplifier circuit design for magneto-resistive (MR) head sensors.

BACKGROUND OF THE INVENTION

Magnetic storage systems store information by magnetizing bit positions on tracks located on a surface of a magnetic media, e.g. a magnetic disk. An actuator arm supports and maintains a Magneto-Resistive (MR) head close to the magnetic disk surface to perform the read and write operations on the disk surface. As the magnetic disk is moved past the MR head, the variations in the magnetic flux passing through the MR head result in changes in the electrical resistance of the MR head.

An MR head is biased with a constant electrical current so that a voltage is present across the MR head. A preamplifier is then used to detect changes in the voltage across the MR head caused by the variations in the electrical resistance of the MR head. Changes in the voltage across the MR head are used to extract the data stored on the magnetic disk surface.

Recently, such MR heads have been used in drastically smaller disk drives. In such environment, the foregoing preamplifiers must have low power requirements and exhibit low intrinsic noise, while providing high-bandwidth operation. This is conventionally accomplished by using large field effect transistors (FETs). Unfortunately, such arrangements exhibit high capacitance which in turn results in a lack of sufficient bandwidth.

Moreover, prior art preamplifier applications are often subject to high levels of low-frequency extrinsic noise resulting from the circuit environment, i.e. hardware, moving head, etc., that is common in many applications of smaller disk drives. Unfortunately, the prior art FETs fail to sufficiently filter such low-frequency extrinsic noise.

There is thus a need for a preamplifier design that exhibits low intrinsic noise and sufficiently filters extrinsic low-frequency noise, while providing high-bandwidth operation.

DISCLOSURE OF THE INVENTION

A preamplifier system is provided for use with a magneto-resistive (MR) sensor. Included is an alternating current (AC) coupling module connected to the MR sensor for blocking a direct current (DC) voltage associated with an input signal, and filtering low frequency noise associated with the input signal. Also provided is a gain stage module coupled to the AC coupling module. The gain stage module includes a plurality of cascode field effect transistors (FETs) configured for amplifying the input signal, while reducing intrinsic noise and increasing operational bandwidth. Coupled to the gain stage module is a control circuit for feeding back an output of the gain stage module for bias regulation and disturbance rejection.

The present embodiment solves the noise, bandwidth and disturbance rejection problems with prior art preamplifier designs for low-power disk drive products, and other small-scale applications. The present circuit structure and method includes two frequency compensated and regulated controls for minimizing flicker noise and thermal noise, while enhancing disk drive data operating bandwidth and providing preamplifier gain stability and an optimal low frequency disturbance rejection capability.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

Figure 1:
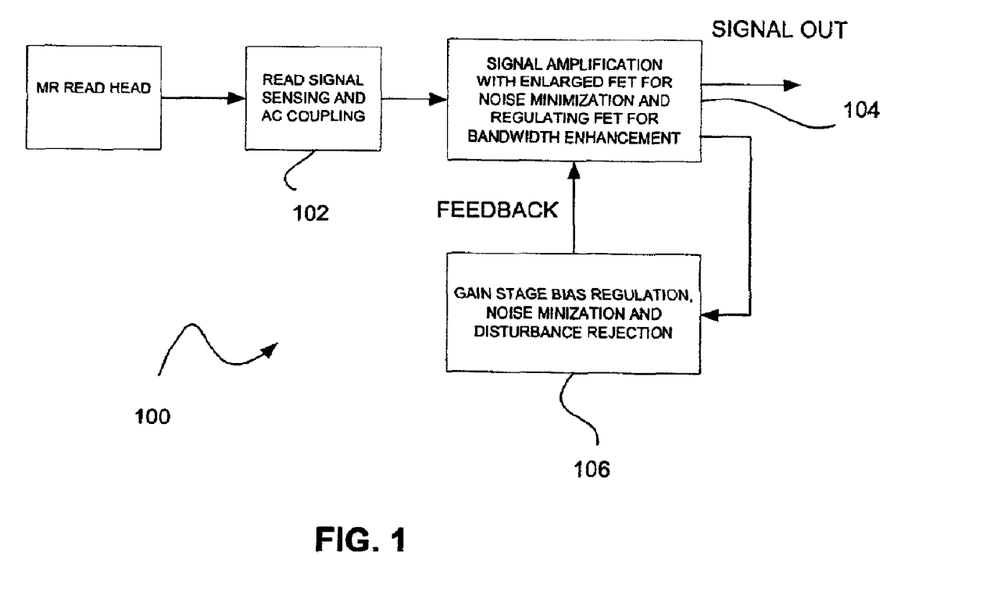
FIG. 1 illustrates a preamplifier system adapted for use with a magneto-resistive (MR) sensor in small-scale disk drive applications.

FIG. 1 illustrates a preamplifier system 100 adapted for use with a magneto-resistive (MR) sensor in small-scale disk drive applications. It should be noted, however, that the present preamplifier system 100 may be used in any other desired application, per the desires of the user.

As shown in FIG. 1, included is an alternating current (AC) coupling module 102 connected to the MR sensor for blocking a direct current (DC) voltage associated with an input signal generated by the MR sensor. It should be noted that such input signal may result from perturbations in the DC voltage applied at the MR sensor. Such perturbations are in turn caused by use of the MR sensor in conjunction with a disk drive system. An exemplary disk drive system will be set forth hereinafter in greater detail during reference to FIG. 3. During use, the AC coupling module 102 further filters low frequency extrinsic noise associated with the input signal.

Also provided is a gain stage module 104 coupled to the AC coupling module 102. The gain stage module 104 includes a plurality of cascode field effect transistors (FETs) configured in a manner that will soon be set forth for amplifying the input signal. The size and configuration of the cascode FETs are preferably selected to minimize low frequency noise, while enhancing the operational bandwidth.

Coupled to the gain stage module 104 is a control circuit 106 for feeding back an output of the gain stage module 104 for bias regulation and disturbance rejection, in a manner that will soon become apparent.

Figure 2:
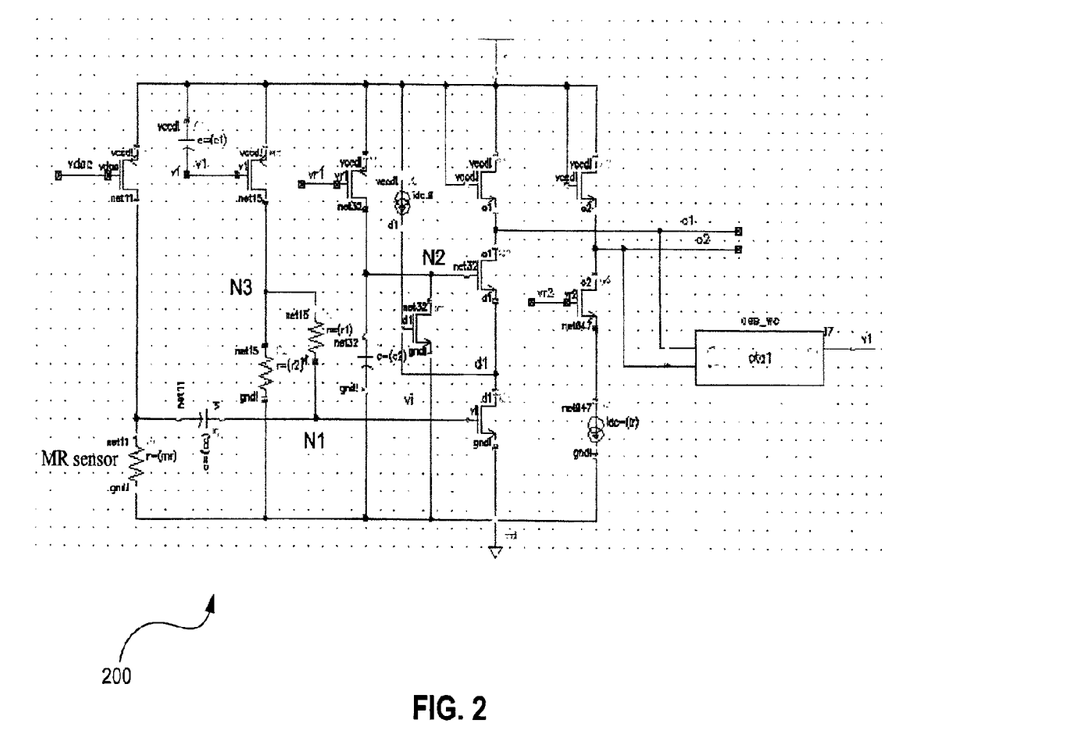
FIG. 2 illustrates an exemplary preamplifier circuit system that is adapted for carrying out the function of each of the various modules of FIG. 1, in accordance with one embodiment.

FIG. 2 illustrates an exemplary preamplifier circuit system 200 that is adapted for carrying out the function of each of the various modules of FIG. 1, in accordance with one embodiment. Of course, varying network configurations may be employed per the desires of the user to carry out similar functionality.

As shown in FIG. 2, a magneto-resistive (MR) sensor is included with a first terminal coupled to ground and a second terminal. A plurality of cascode transistors is also included. For example, a first transistor M1 is provided with a source terminal coupled to ground, a gate terminal coupled to a first node N1, and a drain terminal.

In use, the present preamplifier is capable of low-power operation. This is accomplished by operating at low voltages. In one embodiment, the power source of the present preamplifier may include a 3V power source, a 2.7V power source, or less. For minimizing low frequency noise, the present first transistor M1 may include a field effect transistor (FET) with a dimension ratio (width/length) having a value of at least 4000. Moreover, the following transistors may include similar specifications to optimize operation of the present amplifier.

A second transistor M2 is provided including a source terminal coupled to the drain terminal of the first transistor M1, a gate terminal coupled to a second node N2, and a drain terminal coupled to a first output O1. A third transistor M3 includes a source terminal coupled to the drain terminal of the second transistor M2, a gate terminal and a drain terminal coupled to the power source. Further provided is a fourth transistor M4 including a source terminal coupled to ground, a gate terminal coupled to the drain terminal of the first transistor M1, and a drain terminal coupled to the second node N2. Also provided is a fifth transistor M5 including a source terminal coupled to the power source, a gate terminal, and a drain terminal coupled to the second node N2. As will soon become apparent, the foregoing transistors constitute components of the gain stage module 104 of FIG. 1. In use, the gate terminal of the fifth transistor M5 may be manipulated to control a bias of the gain stage module 104.

Also included is a sixth transistor M6 including a source terminal coupled to the power source, a gate terminal, and a drain terminal coupled to a third node N3. Yet another transistor, a seventh transistor M7, is provided including a source terminal coupled to the power source, a gate terminal, and a drain terminal coupled to the second terminal of the MR sensor. In use, the gate terminal of the seventh transistor M7 may be manipulated to control an amount of DC voltage applied to the MR sensor.

The final transistors define a reference circuit associated with the control circuit 106. Provided is an eighth transistor M8 including a source terminal, a gate terminal, and a drain terminal coupled to a second output O2. In use, the gate and drain terminal of the eighth transistor M8 may be manipulated to control the output DC level. Finally, a ninth transistor M9 is provided including a source terminal coupled to the second output O2, a gate terminal coupled to the power source, and a drain terminal coupled to the power source.

The control circuit 106 further includes an operational transductance amplifier OAT1 with a first input coupled to the first output O1. A second input of the operational transductance amplifier OAT1 is coupled to the second output O2. The operational transductance amplifier OAT1 further includes an output coupled to the gate terminal of the sixth transistor M6. In use, the operational transductance amplifier OAT1 amplifiers a difference between the first and second output O1 & O2 for feeding back the same to the gate terminal of the sixth transistor M6 for control purposes.

Further included is a plurality of current sources. Provided is a first current source, a low-noise reference current source I1, with a first terminal coupled to the source terminal of the eighth transistor M8 and a second terminal coupled to ground. Associated therewith is a low-noise second current source I2 including a first terminal coupled to the power source and a second terminal coupled to the gate terminal of the fourth transistor M4, and the drain terminal of the first transistor M1.

A first capacitor C1 is provided including a first terminal coupled to the power source and a second terminal coupled to the gate terminal of the sixth transistor M6. Also included is a second capacitor C2 including a first terminal coupled to the second node N2 and a second terminal coupled to ground. A third capacitor C3 includes a first terminal coupled to the first node N1 and a second terminal coupled to the second terminal of the MR sensor.

Two resistors are included. First included is a first resistor R1 equipped with a first terminal coupled to the third node N3 and a second terminal coupled to the first node N1. Also provided is a second resistor R2 including a first terminal coupled to the third node N3 and a second terminal coupled to ground.

A single-ended, voltage-sensing preamplifier circuit is thus provided with a high input impendence and AC coupled complimentary-metal-oxide-semiconductor (CMOS) FET gain stage module 104. In one embodiment, the regulated cascode gain stage module 104 may be defined by the first transistor M1, the second transistor M2, the third transistor M3, the fourth transistor M4, the fifth transistor M5, and the second capacitor C2. The control circuit 106 may be designed for bias regulation and disturbance rejection. In one embodiment, the control circuit 106 may be defined by the operational transconductance amplifier OTA1, the sixth transistor M6, the first capacitor C1, the first resistor R1, the second resistor R2, and a reference circuit which is defined by the eighth transistor M8, the ninth transistor M9, and the first current source I1.

In operation, the CMOS implementation of the present MR pre-amplifier provides numerous advantages for various applications including, but not limited to low-power micro and notebook disk drive designs which traditionally require low-noise, high-bandwidth, and optimal disturbance rejection requirements.

Various parameters will now be addressed that are relevant to the operation of the above design. In use, the "flicker noise" (i.e. 1/f, low frequency) of traditional CMOS devices is high and the corner frequency thereof often extends to the data operational frequency range. The most widely accepted model for such flicker noise is represented by Equation #1.

$$vn^2 = Kf*df/(Cox*W*L*f) \qquad \text{Equation \#1}$$

where vfn=flicker noise

Kf=device constant df=noise bandwidth

Cox=gate capacitance

W=width of the gate

L=length of the gate f=operating frequency

As shown, such flicker noise (vfn) is inversely proportional to the gate capacitance (Cox) and the gate area (W*L) of the transistor. Enlarged FET devices can minimize flicker noise, but contain excess parasitic capacitance which limits operational bandwidth.

A commonly used thermal noise model is set forth by Equation #2.

$$vtn^2 = 4*K*T*(2/3)*df/Gm \qquad \text{Equation \#2}$$

where vtn=thermal noise

K=Boltzmann's constant

T=absolute temperature of operation

Gm=transconductance df=noise bandwidth

It should be noted that the transconductance (Gm) is proportional to both the bias current of the transistor and the width-to-length ratio (W/L) thereof. Using a higher bias current to reduce the thermal noise due to a higher transconductance (Gm) is not desirable for low-power applications. Moreover, any attempt to decrease the thermal noise by increasing the width (W) of the transistor will also lower the bandwidth undesirably. The stability of the gain stage module 104 and disturbance rejection capability of the preamplifier are critical for light-weight disk drive products due to the extreme low frequency instability and extended temperature specifications of mobile and hand-held applications.

The cascode gain stage transistors of FIG. 2 provide a bandwidth advantage for low input impendence applications (this assumes no MR connection or voltage source input). This results from a cascode feedback effect, whereby the second transistor M2 achieves a reduced Miller capacitance by maintaining a low voltage gain (A1=V1/Vi) at the drain terminal of the first transistor M1. In one embodiment, such small signal voltage gain may be less than one (1).

As an option, the second transistor M2 may have the size of the first transistor M1 for obtaining unity gain (A1=1), so the bandwidth can be only dominated by the capacitance at the output. See Equation #3.

$$Co = Cl + Cgd2 \qquad \text{Equation \#3}$$

where

Co=output capacitance

Cl=load capacitance

Cgd2=gate-drain capacitance of the second transistor M2

It should be noted that the input of the gain stage module 104 is connected to the highly resistive MR head which may range between about 30–100 ohms. Moreover, the physical size of the first transistor M1 may be chosen to be large for minimizing the flicker noise and thermal noise. See Equations #1 and #2. The bandwidth is much reduced with this highly resistive MR input connection even with the unity gain (A1=1) Miller effect (matched M2).

The dominate pole can be either determined with either Equation #4 or Equation #5.

$$Rh*(Cg1+Cgdb+Cgd1(1+A1*Cgd1)) \qquad \text{Equation \#4}$$

where

Rh=MR sensor resistance

Cg1=gate capacitances of the first transistor M1

Cgdb=gate-drain capacitance of the seventh transistor M7

Cgd1=gate-drain capacitances of the first transistor M1

A1=gain $$R1*Co \qquad \text{Equation \#5}$$

where

R1=load resistance

Co=output capacitance

Forming the first regulated loop with the fourth transistor M4 around the second transistor M2 by sensing the voltage at the drain terminal of the first transistor M1 greatly increases the cascode feedback effect, and minimizes the voltage gain (A1) to be much less than one.

The loop gain is established by the fifth transistor M5 and third capacitor C3 which serves as a frequency compensation capacitor. The reduced voltage gain factor at the drain of first transistor M1 is thus set forth in Equation #6.

$$Gm4/(Go4+Go5) \qquad \text{Equation \#6}$$

where

Gm4=transconductance of the fourth transistor M4

Go4=channel conductance of the fourth transistor M4

Go5=channel conductance of the fifth transistor M5

This factor allows for decreasing the size of the second transistor M2 significantly. The regulated cascode structure with the fourth transistor M4 moves the poles at the input of the MR sensor and the signal output to higher frequency points, which results in much improved bandwidth.

Figure 2A:
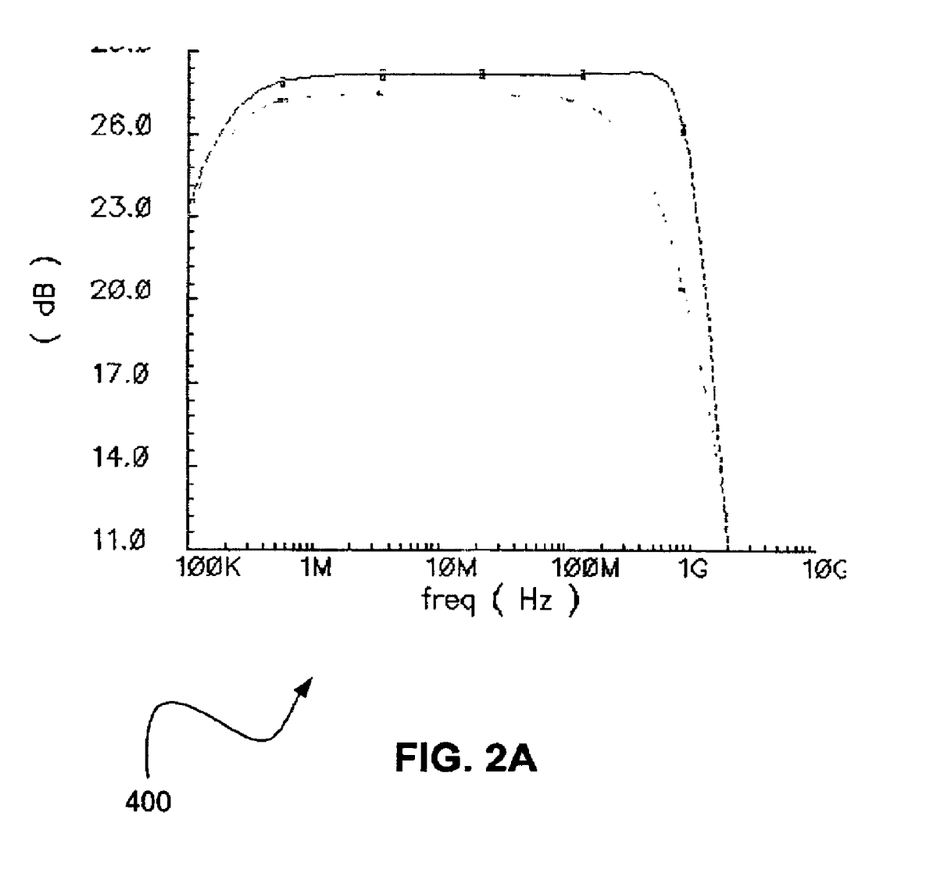
FIG. 2A shows a bandwidth improvement of the MR pre-amplifier from 460 MHz to 950 MHz for 5V operation.

FIG. 2A shows a bandwidth improvement 400 of the MR pre-amplifier from 460 MHz to 950 MHz for 5V operation. It should be noted that such measurements were taken with 0.8 um-length technology. The noise in the gain stage module 104 is dominated by the noise voltage source of the first transistor M1. Without considering the thermal noise of the load and MR sensor resistance, the primary equivalent noise at the input can be approximated by Equation #7.

$$veq^2 = vn1^2 + k2*vn2^2 + k4*vn4^2 + k4/Gm4^2*in1^2 \qquad \text{Equation \#7}$$

where veq=equivalent noise vn1=noise contributed by the first transistor M1 vn2=noise contributed by the second transistor M2 vn4=noise contributed by the fourth transistor M4 k2=Go1*(Go4+Go5)/(Gm1*Gm3))^2 k4=(Go1/Gm1)^2 in1=noise current source of the first transistor M1

Go1=channel conductance of the first transistor M1

Gm1=transconductance of the first transistor M1

Go4=channel conductance of the fourth transistor M4

Go5=channel conductance of the fifth transistor M5

Gm3=transconductance of the third transistor M3

The overall gain of the present preamplifier is provided by the transconductance of the first transistor M1 and the loading resistance of the third transistor M3, which is defined by Equation #8.

$$Gm1/G1 \qquad \text{Equation \#8}$$

where

Gm1=transconductance of the first transistor M1

G1=Gm3 (transconductance of the third transistor M3)

The active resistive load at the third transistor M3 is used in conjunction with the regulated bias loop for gain stability and better thermal tracking. By selecting an adequate high gain setting as defined by Equation #8, an input equivalent noise (veq) of 0.5 nV per square root Hz can be obtained in the middle data frequency band.

The regulated bias current (output of the sixth transistor M6) provided by the second frequency compensated control loop stabilizes the transconductance of the first transistor M1 and the third transistor M3. It also provides gain stability and thermal tracking for the MR gain stage module 104 with the stabilized drain current. The regulated bias current further minimizes the transistor channel length modulation effect. The common mode voltage level of the gain stage module 104 is formed by the reference circuit of the eighth transistor M8, the ninth transistor M9 and the first current source IR.

The differential voltage between the first and second output O1 & O2 is sensed and amplified for producing the bias control through the RC input network to the gate terminal of the first transistor M1. The disturbance (error) rejection function of the control loop is established as set forth in Equation #9.

$$Er(s)=1/(1+Go1(s))=K(s-z1)(s-z2)/(s-p1)(s-p2) \quad \text{Equation #9}$$

where

Er(s)=disturbance (error) rejection

Go1=open loop transfer function

K=low frequency loop gain z1=0 z2=−C3(R1+R2+Rh)

p1=(C3*Rh+1/K)

p2>C3(R1+R2+Rh)

Rh=MR sensor resistance

Figure 2B:
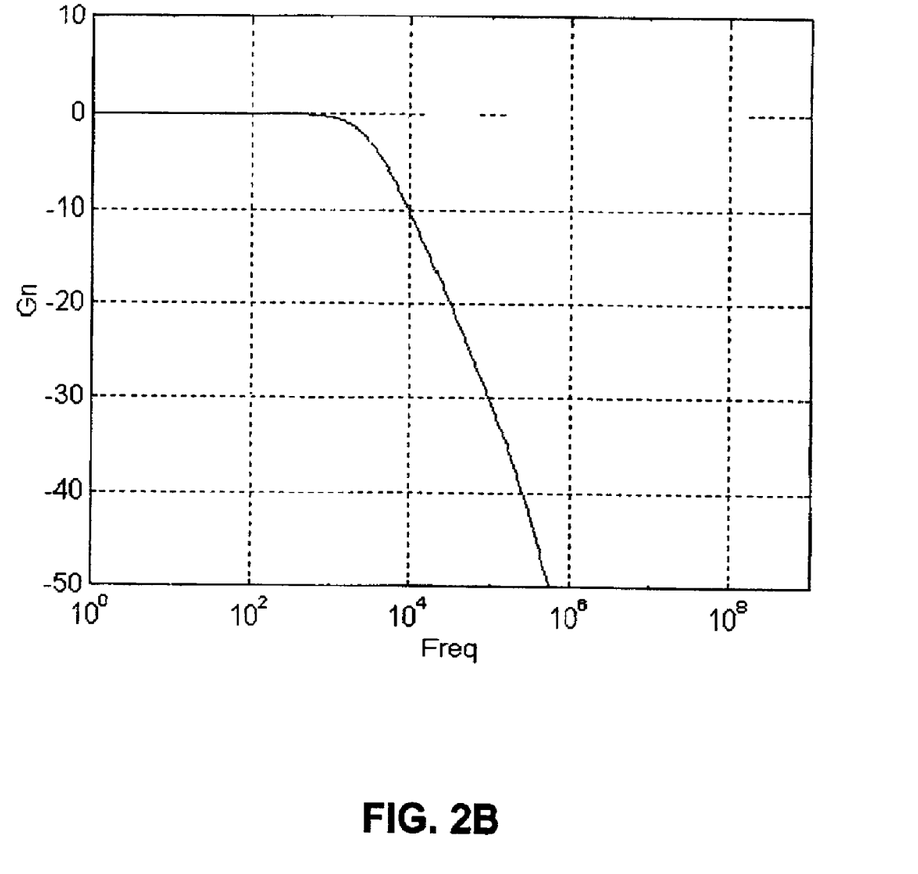
FIG. 2B illustrates a Bode plot of the low frequency disturbance rejection and the closed-loop transfer functions which indicate the optimized low frequency disturbance rejection for frequencies below the cross point.

FIG. 2B illustrates a Bode plot of the low frequency disturbance rejection and the closed-loop transfer functions which indicate the optimized low frequency disturbance rejection for frequencies below the cross point. The stabilized bias loop also reduces the current setting tolerance for the current injection scheme with the second current source I2 for reducing additional noise at the first transistor M1.

Figure 3:
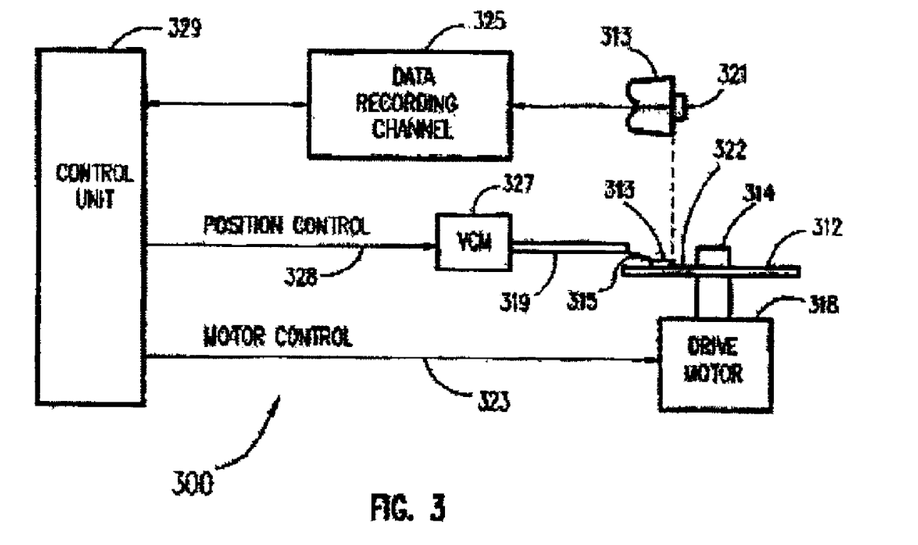
FIG. 3 is a perspective drawing of a magnetic recording disk drive system in accordance with one embodiment of the present invention.

Referring now to FIG. 3, there is shown a disk drive 300 embodying the present invention. The following description of a magnetic disk storage system, and the accompanying illustration of FIG. 3 are for representation purposes only. It should be apparent that disk storage systems may contain a large number of disks and actuators, and each actuator may support a number of sliders.

As shown in FIG. 3, at least one rotatable magnetic disk 312 is supported on a spindle 314 and rotated by a disk drive motor 318. The magnetic recording media on each disk is in the form of an annular pattern of concentric data tracks (not shown) on disk 312.

At least one slider 313 is positioned on the disk 312, each slider 313 supporting one or more magnetic read/write heads 321. More information regarding such heads 321 will be set forth hereinafter during reference to FIG. 4. As the disks rotate, slider 313 is moved radially in and out over disk surface 322 so that heads 321 may access different portions of the disk where desired data are recorded. Each slider 313 is attached to an actuator arm 319 by way of a suspension 315. The suspension 315 provides a slight spring force which biases slider 313 against the disk surface 322. Each actuator arm 319 is attached to an actuator 327. The actuator 327 as shown in FIG. 3 may be a voice coil motor (VCM). The VCM comprises a coil movable within a fixed magnetic field, the direction and speed of the coil movements being controlled by the motor current signals supplied by controller 329.

During operation of the disk storage system, the rotation of disk 312 generates an air bearing between slider 313 and disk surface 322 which exerts an upward force or lift on the slider. The air bearing thus counter-balances the slight spring force of suspension 315 and supports slider 313 off and slightly above the disk surface by a small, substantially constant spacing during normal operation.

The various components of the disk storage system are controlled in operation by control signals generated by control unit 329, such as access control signals and internal clock signals. Typically, control unit 329 comprises logic control circuits, storage and a microprocessor. The control unit 329 generates control signals to control various system operations such as drive motor control signals on line 323 and head position and seek control signals on line 328. The control signals on line 328 provide the desired current profiles to optimally move and position slider 313 to the desired data track on disk 312. Read and write signals are communicated to and from read/write heads 321 by way of recording channel 325. It is in this channel 325 that the present preamplifier may be positioned in one embodiment.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A preamplifier system, comprising:

a magneto-resistive (MR) sensor;

an alternating current (AC) coupling module coupled to the MR senior for blocking a direct current (DC) voltage associated with an input signal, and filtering low frequency noise associated with the input signal;

a gain stage module coupled to the AC coupling module, the gain stage module including a plurality of cascade field effect transistors (FETs) configured for amplifying the input signal, while reducing intrinsic noise and increasing operational bandwidth;

wherein the gain stage module includes a first transistor including a source terminal coupled to ground, a gate terminal, and a drain terminal; a second transistor including a source terminal coupled to the drain terminal of the first transistor, a gate terminal, and a drain terminal coupled to the output of the gain stage module.

2. A preamplifier system, comprising:

a magneto-resistive (MR) sensor;

an alternating current (AC) coupling module coupled to the MR sensor for blocking a direct current (DC) voltage associated with an input signal, and filtering low frequency noise associated with the input signal;

a gain stage module coupled to the AC coupling module, the gain stage module including a plurality of cascode field effect transistors (FETs) configured for amplifying the input signal, while reducing intrinsic noise and increasing operational bandwidth; and a control circuit coupled to the gain stage module for feeding back an output of the gain stage module, wherein one of the cascode FETs includes a dimension ratio (width/length) with a value of at least 4000.

3. A preamplifier system, comprising:

a magneto-resistive (MR) sensor;

an alternating current (AC) coupling module coupled to the MR sensor for blocking a direct current (DC) voltage associated with an input signal, and filtering low frequency noise associated with the input signal;

a gain stage module coupled to the AC coupling module, the gain stage module including a plurality of cascade field effect transistors (FETs) configured for amplifying the input signal, while reducing intrinsic noise and increasing operational bandwidth; and a control circuit coupled to the gain stage module for feeding back an output of the gain stage module, wherein the gain stage module includes a first transistor including a source terminal coupled to ground, a gate terminal, and a drain terminal; a second transistor including a source terminal coupled to the drain terminal of the first transistor, a gate terminal, and a drain terminal coupled to the output of the gain stage module; a third transistor including a source terminal coupled to the drain terminal of the second transistor, a gate terminal coupled to the power source, and a drain terminal coupled to the power source; a fourth transistor including a source terminal coupled to ground, a gate terminal coupled to the drain terminal of the first transistor, and a drain terminal coupled to the gate terminal of the second transistor; a fifth transistor including a source terminal coupled to the power source, a gate terminal, and a drain terminal coupled to the drain terminal of the fourth transistor and the gate terminal of the second transistor, and a capacitor coupled between ground and the drain terminal of the fifth transistor, the drain terminal of the fourth transistor, and the gate terminal of the second transistor.

4. The system as recited in claim 3, wherein the AC coupling module includes a capacitor including a first terminal coupled to the gate terminal of the first transistor and the MR sensor.

5. The system as recited in claim 3, wherein the control circuit includes an operational transductance amplifier with a first input coupled to the output of the gain stage module and a second input coupled to a reference output, the operational transductance amplifier including an output coupled to a gate terminal of a sixth transistor including a source terminal coupled to the power source, and a drain terminal, the control circuit further including a first resistor having a first terminal coupled to the drain terminal of the sixth transistor and a second terminal coupled to the gate terminal of the first transistor, a second resistor including a first terminal coupled to the drain terminal of the sixth transistor and a second terminal coupled to ground.

6. The system as recited in claim 5, wherein the reference output is defined by an eighth transistor including a source terminal, a gate terminal, and a drain terminal coupled to the reference output; a ninth transistor including a source terminal coupled to the reference output, a gate terminal coupled to the power source, and a drain terminal coupled to the power source; and a current source including a first terminal coupled to the source terminal of the eighth transistor and a second terminal coupled to ground.

7. The system as recited in claim 3, wherein a gain at the drain terminal of the first transistor is less than one (1).

8. A preamplifying method, comprising:
  receiving an input signal from a magneto-resistive (MR) sensor;
  blocking a direct current (DC) voltage associated with the input signal;
  filtering low frequency noise associated with the input signal;
  amplifying the input signal utilizing a plurality of cascode field effect transistors (TETs)
  including a first transistor including a source terminal coupled to ground, a gate terminal, and a drain terminal a second transistor including a source terminal coupled to the drain terminal of the first transistor, a gate terminal, and a drain terminal coupled to the output of the gain stage module; a third transistor including a source terminal coupled to the drain terminal of the second transistor, a gate terminal coupled to the power source, and a drain terminal coupled to the power source; a fourth transistor including a source terminal coupled to ground, a gate terminal coupled to the drain terminal of the first transistor, and a drain terminal coupled to the gate terminal of the second transistor.

9. A preamplifier circuit, comprising:
  a first transistor including a source terminal coupled to ground, a gate terminal, and a drain terminal;
  a second transistor including a source terminal coupled to the drain terminal of the first transistor, a gate terminal, and a drain terminal coupled to an output;
  a third transistor including a source terminal coupled to the drain terminal of the second transistor, a gate terminal coupled to the power source, and a drain terminal coupled to the power source;
  a fourth transistor including a source terminal coupled to ground, a gate terminal coupled to the drain terminal of the first transistor, and a drain terminal coupled to the gate terminal of the second transistor;
  a fifth transistor including a source terminal coupled to the power source, a gate terminal, and a drain terminal coupled to the gate terminal of the second transistor and the drain terminal of the fourth transistor; and
  a capacitor coupled between ground and the drain terminal of the fifth transistor, the drain terminal of the fourth transistor, and the gate terminal of the second transistor.

10. The preamplifier circuit as recited in claim 9, wherein the first transistor includes a field effect transistor (FET).

11. The preamplifier circuit as recited in claim 10, wherein the first transistor includes a dimension ratio (width/length) with a value of at least 4000.

12. The preamplifier circuit as recited in claim 9, and further comprising a sixth transistor including a source terminal coupled to the power source, a gate terminal, and a drain terminal.

13. The preamplifier circuit as recited in claim 12, and further comprising a seventh transistor including a source terminal coupled to the power source, a gate terminal, and a drain terminal coupled to a magneto-resistive (MR) sensor.

14. The preamplifier circuit as recited in claim 13, and further comprising an eighth transistor including a source terminal, a gate terminal, and a drain terminal coupled to a second output.

15. The preamplifier circuit as recited in claim 14, and further comprising a ninth transistor including a source terminal coupled to the second output, a gate terminal coupled to the power source, and a drain terminal coupled to the power source.

16. The preamplifier circuit as recited in claim 15, and further comprising an operational transductance amplifier with a first input coupled to the first output and a second input coupled to the second output, the operational transductance amplifier including an output coupled to the gate terminal of the sixth transistor.

17. The preamplifier circuit as recited in claim 16, and further comprising a first current source including a first terminal coupled to the source terminal of the eighth transistor and a second terminal coupled to ground.

18. The preamplifier circuit as recited in claim 17, and further comprising a second current source including a first terminal coupled to the power source and a second terminal coupled to the gate terminal of the fourth transistor.

19. The preamplifier circuit as recited in claim 18, and further comprising another capacitor including a first terminal coupled to the gate terminal of the first transistor and a second terminal coupled to a magneto-resistive (MR) sensor.

20. A preamplifier circuit system, comprising:

a magneto-resistive (MR) sensor including a first terminal coupled to ground and a second terminal;

a first transistor including a source terminal coupled to ground, a gate terminal coupled to a first node, and a drain terminal;

a second transistor including a source terminal coupled to the drain terminal of the first transistor, a gate terminal coupled to a second node, and a drain terminal coupled to a first output;

a third transistor including a source terminal coupled to the drain terminal of the second transistor, a gate terminal coupled to a power source, and a drain terminal coupled to the power source;

a fourth transistor including a source terminal coupled to ground, a gate terminal coupled to the drain terminal of the first transistor, and a drain terminal coupled to the second node;

a fifth transistor including a source terminal coupled to the power source, a gate terminal, and a drain terminal coupled to the second node;

a sixth transistor including a source terminal coupled to the power source, a gate terminal, and a drain terminal coupled to a third node;

a seventh transistor including a source terminal coupled to the power source, a gate terminal, and a drain terminal coupled to the second terminal of the MR sensor; an eighth transistor including a source terminal, a gate terminal, and a drain terminal coupled to a second output;

a ninth transistor including a source terminal coupled to the second output, a gate terminal coupled to the power source, and a drain terminal coupled to the power source;

an operational transductance amplifier with a first input coupled to the first output and a second input coupled to the second output, the operational transductance amplifier including an output coupled to the gate terminal of the sixth transistor;

a first current source including a first terminal coupled to the source terminal of the eighth transistor and a second terminal coupled to ground;

a second current source including a first terminal coupled to the power source and a second terminal coupled to the gate terminal of the fourth transistor;

a first capacitor including a first terminal coupled to the power source and a second terminal coupled to the gate terminal of the sixth transistor;

a second capacitor including a first terminal coupled to the second node and a second terminal coupled to ground;

a third capacitor including a first terminal coupled to the first node and a second terminal coupled to the second terminal of the MR sensor;

a first resistor including a first terminal coupled to the third node and a second terminal coupled to the first node; and a second resistor including a first terminal coupled to the third node and a second terminal coupled to ground.

21. A disk drive system, comprising:

a magnetic recording disk;

a magnetic head including an magneto-resistive (MR) sensor;

an actuator for moving the magnetic head across the magnetic recording disk so the magnetic head may access different regions of the magnetic recording disk; and a controller electrically coupled to the magnetic head including a preamplifier including:

an alternating current (AC) coupling module coupled to the MR sensor for blocking a direct current (DC) voltage associated with an input signal, and filtering low frequency noise associated with the input signal, a gain stage module coupled to the AC coupling module, the gain stage module including a plurality of cascode field effect transistors (FETs) configured for amplifying the input signal, while reducing intrinsic noise and increasing operational bandwidth, wherein the gain stage module includes a first transistor including a source terminal coupled to ground, a gate terminal, and a drain terminal; a second transistor including a source terminal coupled to the drain terminal of the first transistor, a gate terminal, and a drain terminal coupled to the output of the gain stage module; a third transistor including a source terminal coupled to the drain terminal of the second transistor, a gate terminal coupled to the power source, and a drain terminal coupled to the power source; a fourth transistor including a source terminal coupled to ground, a gate terminal coupled to the drain terminal of the first transistor, and a drain terminal coupled to the gate terminal of the second transistor; a fifth transistor including a source terminal coupled to the power source, a gate terminal, and a drain terminal coupled to the drain terminal of the fourth transistor and the gate terminal of the second transistor; and a capacitor coupled between ground and the drain terminal of the fifth transistor, the drain terminal of the fourth transistor, and the gate terminal of the second transistor, and a control circuit coupled to the gain stage module for feeding back an output of the gain stage module.

* * * * *

UNITED STATES PATENT AND TRADEMARK OFFICE
CERTIFICATE OF CORRECTION

PATENT NO. : 6,870,696 B2
DATED : March 22, 2005
INVENTOR(S) : Cheung et al.

It is certified that error appears in the above-identified patent and that said Letters Patent is hereby corrected as shown below:

<u>Column 8,</u>
Line 24, change "senior" to -- sensor --;
Lines 28 and 62, change "cascade" to -- cascode --;

<u>Column 9,</u>
Line 59, change "FET" to -- TET --.

Signed and Sealed this

Twenty-eighth Day of June, 2005

JON W. DUDAS
*Director of the United States Patent and Trademark Office*